United States Patent [19]

Hashimoto

[11] 4,104,686

[45] Aug. 1, 1978

[54] TAPE CASSETTE WITH REEL TO REEL AND ENDLESS TAPES

[75] Inventor: Kazuo Hashimoto, Tokyo, Japan

[73] Assignee: Hashimoto Corporation, Tokyo, Japan

[21] Appl. No.: 853,512

[22] Filed: Nov. 21, 1977

[30] Foreign Application Priority Data

Nov. 22, 1976 [JP] Japan .................. 51-140561

[51] Int. Cl.² ............... B65H 17/48; G11B 23/04; H04M 1/64
[52] U.S. Cl. .................. 360/132; 179/6 R; 242/55.19 A; 242/197
[58] Field of Search ............ 179/6 R; 360/132; 242/55.19 A, 55.19 R, 194, 197, 198, 199, 200

[56] References Cited

U.S. PATENT DOCUMENTS 3,612,422  10/1971  Ito ............................ 242/55.19 A
3,633,837  1/1972   Esashi ..................... 242/55.19 A
3,640,479  2/1972   Hata ....................... 360/132

Primary Examiner—Raymond F. Cardillo, Jr.
Attorney, Agent, or Firm—Gerald J. Ferguson, Jr.; Joseph J. Baker

[57] ABSTRACT

A tape cassette comprising a cassette composed of an upper and a lower cassette half, and a partition plate disposed in the cassette to extend therein in a transverse direction to define an upper and a lower compartment. The partition plate has first and second reel insertion holes. The cassette has disposed therein first and second reels extending into the upper and lower compartments through the first and second reel insertion holes of the partition plates, respectively. The lower compartment has housed therein a first magnetic tape retained at one end to the lower half part of the first reel and at the other end to the lower half part of the second reel and guided to travel between the first and second reels. The upper compartment has disposed therein a third reel loosely engaged with the upper half part of the first reel and has housed therein a second magnetic tape endlessly wound on the third reel.

1 Claim, 9 Drawing Figures

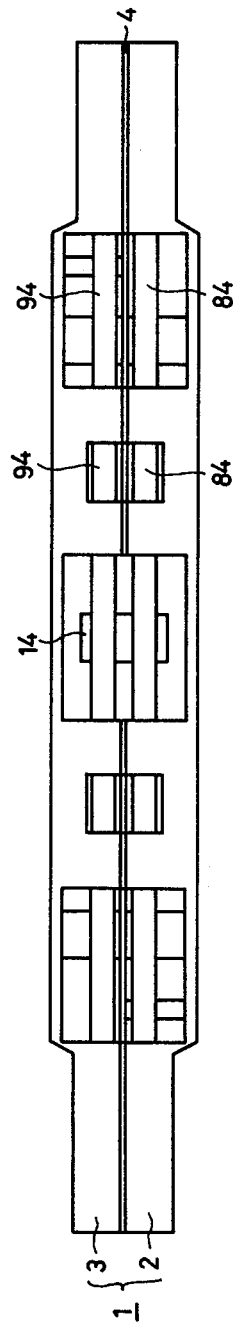
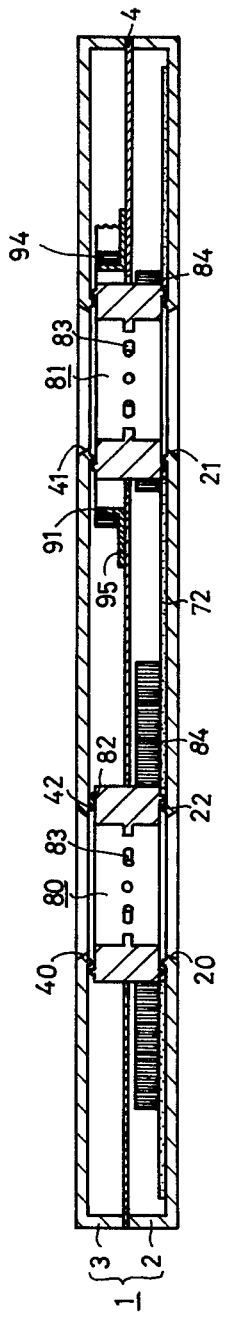
Fig.1
Fig.3

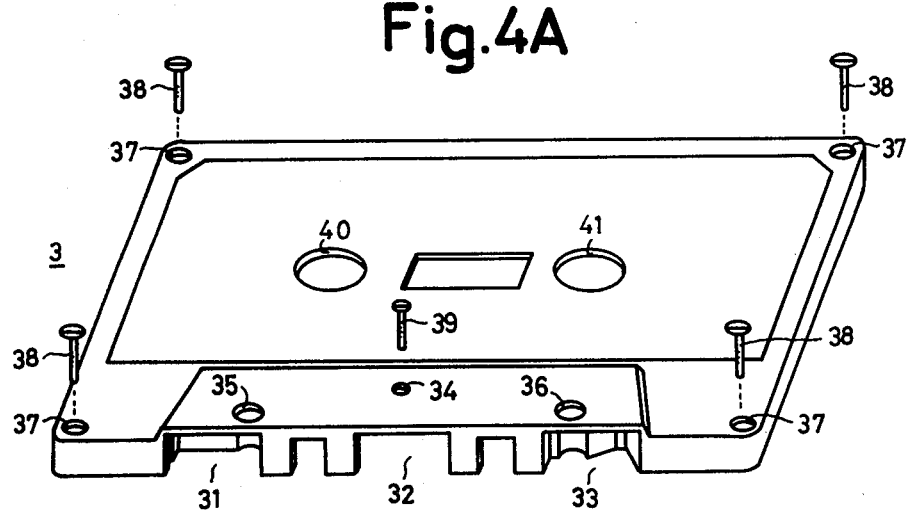
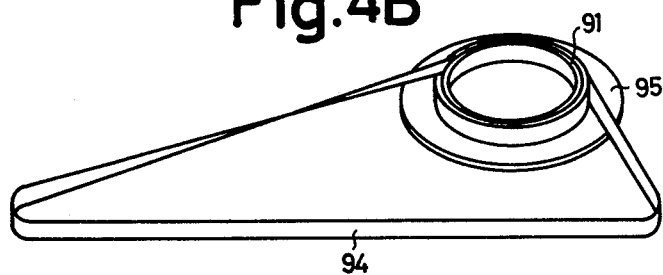
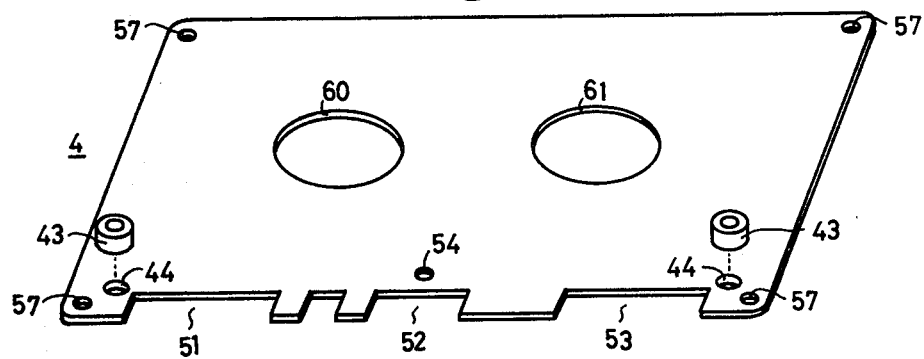

TAPE CASSETTE WITH REEL TO REEL AND ENDLESS TAPES

BACKGROUND OF THE INVENTION

1. Field of the Invention

This invention relates to improvements in a tape cassette which housed therein a pair of reels, a first magnetic tape wound thereon to travel therebetween, another reel and a second magnetic tape endlessly wound thereon.

2. Description of the Prior Art

The tape cassette of this kind is suitable for use with an automatic telephone answering and recording set which reproduces a message for transmission to the calling party and records a message from the calling party. The reason is that the second magnetic tape endlessly wound on one reel is suitable for previously recording a relatively short answering message of a predetermined content and reproducing it for transmission to the calling party and that the first magnetic tape wound on the pair of reels is suitable for recording callers' messages of different lengths and contents for subsequent reproduction.

Conventional tape cassettes of this kind have the defect that they are relatively complicated in structure and that during driving of the second tape, if it touches the interior surface of the cassette at the tape drawing-out position on the reel to prevent a smooth tape driving, it is likely to result in stoppage of the tape driving.

SUMMARY OF THE INVENTION

Accordingly, this invention has for its object to provide a novel tape cassette of this kind which is free from the abovesaid defects of the prior art tape cassettes.

The invention will become more apparent from the following description taken in conjunction with the accompanying drawings.

BRIEF DESCRIPTION OF THE DRAWINGS

FIG. 1 is a front view of the tape cassette of this invention;

FIG. 3 is its cross-sectional view; and

FIGS. 4A to 4F are its exploded perspective views.

DESCRIPTION OF THE PREFERRED EMBODIMENTS

Figure 2:
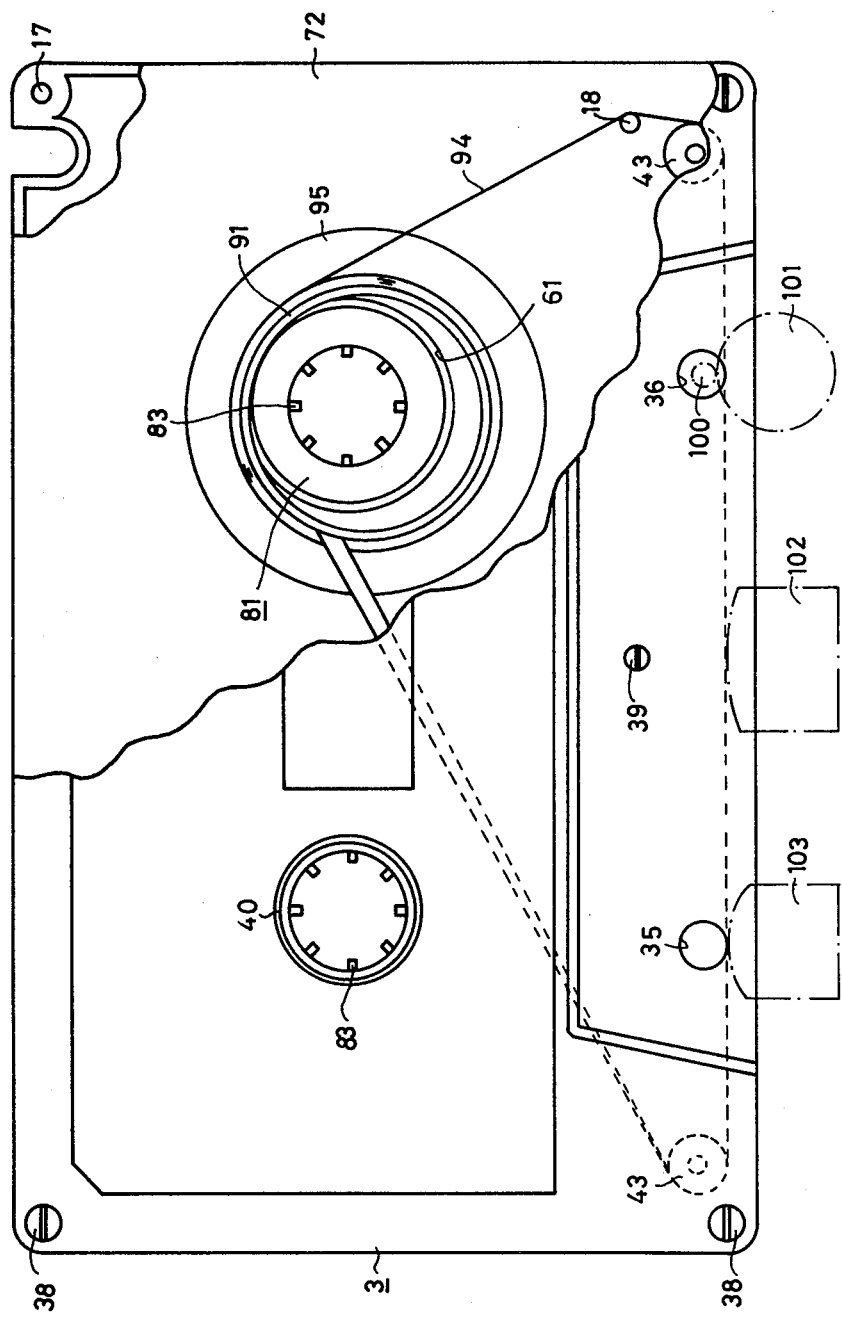
FIG. 2 is a plan view, partly cut away, of the tape cassette shown in FIG. 1.

FIGS. 1 to 3 show an embodiment of the tape cassette of this invention, which has a cassette 1. The cassette 1 is identical in construction with that of the so-called Philips type tape cassette, and accordingly composed of a lower cassette half 2 and an upper cassette half 3.

Figure 4D:
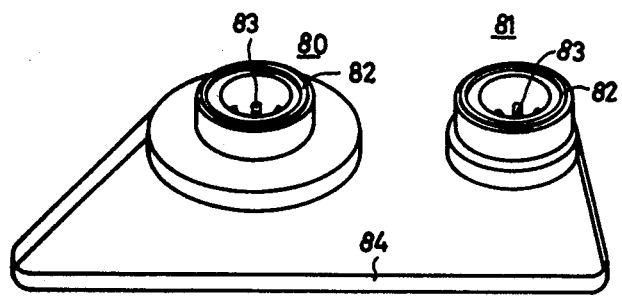
Figure 4E:
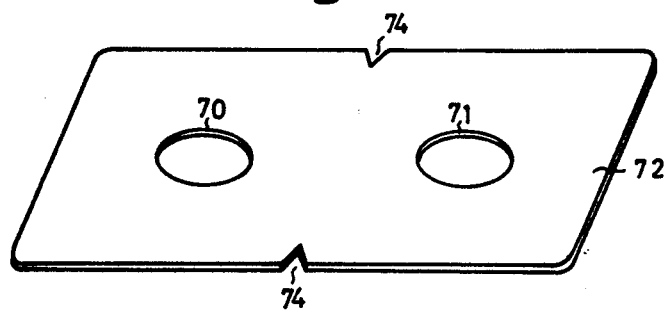
Figure 4F:
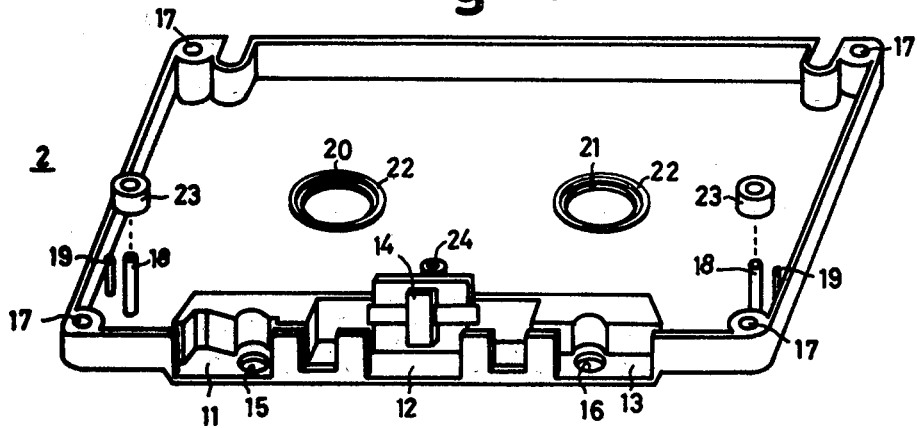

With particular reference to FIG. 4F showing the lower cassette half 2, as is the case with the lower cassette half of the so-called Philips type tape cassette, the front panel of the lower cassette half 2 has formed therein recesses 11, 12 and 13 cut out from the side of its upper end face. A tape pad 14 is disposed on the inside of the front panel at the position corresponding to the recess 12. Capstan insertion holes 15 and 16 are formed in the bottom panel at the positions corresponding to the recesses 11 and 13 of the front panel, respectively. At the four corners of the lower cassette half 2, there are formed female screws 17. Red shaft insertion holes 20 and 21 are formed in the bottom panel at the centers of its left and right half portions, respectively. On the inside of the bottom panel, projecting rings 22 for the reel positioning use are formed to surround the reel shaft insertion holes 20 and 21, respectively. A female screw member 24 is planted at the center of the forward portion of the bottom panel. Further, shafts 18, whose lengths are sufficiently larger than the depth of the lower cassette half 2 on the side thereof, are planted on the bottom plate at the right and left sides of its forward portion, respectively. The shafts 18 carry at their lower haft portions tape guide rollers 23, respectively. And tape guide pins 19, whose lengths are substantially equal to the inside depth of the lower cassette half 2, are similarly planted on the bottom panel at the right and left sides of its forward portion, respectively.

With particular reference to FIG. 4A, as is the case with the so-called Philips type tape cassette, the upper cassette half 3 has recesses 31, 32 and 33 formed in the front panel, a screw hole 34 formed in the top panel at the center of its forward portion, capstan insertion holes 35 and 36 formed in the top panel at the positions corresponding to the recesses 31 and 33, respectively, screw holes 37 formed in the top panel at its four corners, respectively, reel shaft insertion holes 40 and 41 formed in the top panel at the centers of its left and right half portions, respectively, and projecting rings 42 for the reel positioning use which are formed to surround the reel shaft insertion holes 40 and 41, respectively.

An example of the tape cassette of this invention has a partition plate 4 whih is disposed within the cassette 1 to transversely extend therein to define upper and lower compartments.

In this case, the partition plate 4 has the same length and width as the cassette halves 2 and 3. As is evident from FIG. 4C, the partition plate 4 has recesses 51, 52 and 53 formed at its front marginal portion, mounting screw insertion holes 57 formed at its four corners, shaft insertion holes 44 formed at the right and left sides of its forward portion, respectively, a mounting screw insertion hole 54 formed at the center of the forward portion and reel insertion holes 60 and 61 formed at the centers of its left and right half portions, respectively.

The partition plate 4 is disposed on the abovesaid lower cassette half 2 with the shafts 18 of the latter inserted in the shaft insertion holes 44 of the former. Then, the tape guide rollers 43 are respectively mounted on the shafts 18 projecting upwardly of the partition plate 4. Next, the upper cassette half 3 is mounted on the partition plate 4 and mounting screws 38 are respectively screwed into the female screws 17 of the lower cassette half 2 through the mounting screw insertion holes 37 and 57 of the upper cassette half 3 and the partition plate 4 and, further, a mounting screw 39 is similarly screwed into the female screw 24 of the lower cassette half 2 through the screw insertion holes 34 and 54 of the top cassette half 3 and the partition plate 4, respectively. Thus, the partition plate 4 is assembled with the cassette 1 as one body. In this instance, the recess 11 of the lower cassette half 2 and the recess 31 of the upper cassette half 3 form one window. Similarly, the recesses 12 and 32 form one window and the recesses 13 and 33 form one window. The reel shaft insertion hole 20 of the lower cassette half 2, the reel insertion hole 60 of the partition plate 4 and the reel shaft insertion hole 40 of the top cassette half 3 are coaxial. Similarly, the reel shaft insertion holes 21 and 41 and the reel insertion hole 61 are coaxial with each other and the pairs of capstan insertion holes 15 and 35, and 16 and 36 are also coaxial with each other.

In the lower compartment formed by the provision of the partition plate 4 in the cassette 1 as described above, a tape receiving plate 72 is disposed. The tape receiving plate 72 has a smooth surface and, as is evident from FIG. 4E, it has reel shaft insertion holes 70 and 71 formed at the centers of its left and right half portions, respectively, and, if necessary, recesses 74 formed at the centers of its front and rear marginal edges, respectively. The tape receiving plate 72 is merely placed on the inside of the bottom panel of the lower cassette half 2 forming the lower compartment.

The cassette 1 having disposed therein the partition plate 4 carries a pair of reels 80 and 81. As is apparent from FIG. 4D, the reels 80 and 81 are tubular and respectively have on their inner peripheral surfaces pluralities of engaging pins 83 extending radially thereof and, on their upper and lower end faces, positioning projecting rings 82 formed integrally therewith, respectively. The axial length of each of the reels 80 and 81 is a little smaller than the spacing between the upper face of the tape receiving plate 72 placed on the bottom panel of the lower cassette half 2 and the inner face of the top panel of the upper cassette half 3. Accordingly, the reels 80 and 81 are mounted in the cassette 1 extending into the lower and upper compartments through the reel insertion holes 60 and 61 of the partition plate 4, respectively. The reels 80 and 81 are positioned by the projecting rings 82 respectively formed on their lower and upper end faces and the projecting rings 22 and 42 respectively formed the bottom panel of the lower cassette half 2 and the top panel of the upper cassette half 3, and are freely rotatable.

As is seen from FIG. 4D, the bottom compartment has mounted therein a magnetic tape 84 which is retained at one end to the lower half portion of the reel 80 and at the other end to the lower half portion of the reel 81 to extend between the reels 80 and 81. In this case, the magnetic tape 84 is guided by the tape guide pins 19 and the tape guide rollers 23 to extend adjacent the inside of the front panel of the lower cassette half 2. Accordingly, the surface of the magnetic tape 84 is exposed to the outside of the cassette 1 through the recesses 11, 12 and 13 of the front panel of the lower cassette half 2, while the back of the magnetic tape 84 is in direct contact with or adjacent the tape pad 14.

The upper compartment carries one reel 91. As is evident from FIG. 4B, the reel 91 is a tubular member whose inner diameter is larger than the outer diameters of the abovesaid reels 80 and 81 and which has a flange 95 extending outwardly from the outer periphery of the lower end of the tubular member itself. The reel 91 is positioned in the upper compartment while having loosely inserted thereinto the upper half part of the reel 81. Accordingly, the reel 91 is positioned by the upper half part of the reel 81 and is freely rotatable.

Further, the upper compartment carries an endless magnetic tape 94 wound on the reel 94, as is apparent from FIG. 4B. In this instance, the magnetic tape 94 is guided by the tape guide rollers 43 to extend adjacent the inside of the front panel of the upper cassette half 3. Accordingly, the surface of the magnetic tape 94 is exposed to the outside of the cassette 1 through the recesses 31, 32 and 33 of the front panel of the upper cassette half 3, while the back of the magnetic tape 94 is in direct contact with or adjacent the tape pad 14.

The above has clarified the construction of the tape cassette of this invention. As is the case with the Philips type tape cassette, a capstan 100 indicated by the chain line in FIG. 2 is inserted into the cassette 1 to the capstan insertion hole 36 of the upper cassette half 3 through the capstan insertion hole 16 of the lower cassette half 2 and two reel shafts, not shown, are inserted into the cassette 1 to engage with the reels 80 and 81 through the reel shaft insertion holes 20 and 21 of the lower cassette half 2. Then, when a pinch roller 101 indicated by the chain line is brought into the cassette 1 through the window defined by the recesses 13 and 33 of the lower and upper cassette halves 2 and 3, the magnetic tapes 84 and 94 are both gripped between the capstan 100 and the pinch roller 101. Accordingly, assuming that the capstan 100 is rotating counterclockwise and that the reel shaft engaged with the reel 81 is being driven counterclockwise to drive the reel 81 counterclockwise, the magnetic tape 84 is driven from the side of the reel 80 to the side of the reel 81 and taken up on the reel 81. The magnetic tape 94 is endlessly driven from the left side to the right side of the capstan 100. In operation, a recording and reproducing magnetic head 102 having magnetic head elements at its upper and lower positions, indicated by the chain line, is brought into the cassette 1 through the window defined by the recesses 12 and 32 of the lower and upper cassette halves 2 and 3 to make contact with the magnetic tapes 84 and 94. Similarly, an erasing magnetic head 103 indicated by the chain line is brought into the cassette 1 through the window defined by the recesses 11 and 31 of the lower and upper cassette halves 2 and 3 to make contact with the magnetic tapes 84 and 94. When energizing the erasing magnetic head 103 and supplying signals to the two magnetic head elements of the recording and reproducing magnetic head 102, respectively, the signals are respectively recorded on the magnetic tapes 84 and 94. When the erasing magnetic head 103 is not energized nd no signals are supplied to the recording and reproducing magnetic head 102, the signals recorded on the magnetic tapes 84 and 94 are reproduced from the two magnetic head elements of the recording and reproducing magnetic head 102.

With the capstan 100 inserted in the cassette 1 and reel shafts (not shown) engaged with the reels 80 and 81, if the reel 80 is rotated clockwise through the reel shaft engaged therewith without bringing the pinch roller 101 into the cassette 1, the magnetic tape 84 is driven from the side of the reel 81 to the side of the reel 80 and is taken up on the reel 80. In this instance, however, since the pinch roller 101 does not make contact with the capstan 100, the magnetic tape 94 is not driven.

Accordingly, the tape cassette of this invention is suitable for use with the aforesaid automatic telephone answering and recording set.

By the way, the tape cassette of the present invention has the structure that the reel 91 having wound thereon the magnetic tape 94 endlessly driven is loosely engaged with the upper half part of the reel 81 for the magnetic tape 84 driven from the side of the reel 80 to the side of the reel 81 or vice versa and is automatically positioned thereby in the upper compartment. Accordingly, the reel 91 is disposed in the upper compartment at the predetermined position without using any special parts for positioning the reel 91. That is, the tape cassette of this invention has the remarkable feature that it is simple-structured using less parts than in the prior art tape cassettes.

Further, in the tape cassette of this invention, the reel 91 having wounded thereon the endlessly driven magnetic tape 94 is disposed in the upper compartment while being loosely engaged with the upper half part of the reel 81 for the magnetic tape 84 which is not endlessly driven, as described above. Consequently, while the magnetic tape 94 is driven in the manner described above, even it it touches the inside of the top panel of the upper cassette half 3, for example, at the tape drawing-out position on the reel 91 above the its outer peripheral surface to disturb a smooth driving of the magnetic tape 94, the back tension of the magnetic tape 94 increases to move the reel 91 forwardly to correct its inner peripheral surface with the upper half part of the outer peripheral surface of the reel 81. Since the tape 94 has been driven by the capstan 100 and the pinch roller 101 without contacting the reel 81 until then, the reel 91 rotating with driving of the magnetic tape 94 is rotated counterclockwise by the reel 81, ensuring a smooth driving of the magnetic tape 94.

The foregoing is merely illustrative of this invention and many modification and variations may be effected without departing from the scope of the novel concepts of this invention.

What is claimed is:

1. A tape cassette comprising a cassette composed of an upper and a lower cassette half, and a partition plate disposed in the cassette to extend therein in a transverse direction to define an upper and a lower compartment, wherein the partition plate has first and second reel insertion holes, wherein the cassette has disposed therein first and second reels extending into the upper and lower compartments through the first and second reel insertion holes of the partition plates, respectively, wherein the lower compartment has housed therein a first magnetic tape retained at one end to the lower half part of the first reel and at the other end to the lower half part of the second reel and guided to travel between the first and second reels, and wherein the upper compartment has disposed therein a third reel loosely engaged with the upper half part of the first reel and has housed therein a second magnetic tape endlessly wound on the third reel.

* * * * *